(12) United States Patent
Harada et al.

(10) Patent No.: US 6,685,466 B2
(45) Date of Patent: Feb. 3, 2004

(54) ROTARY HEARTH FURNACE FOR PRODUCING REDUCED METAL AND METHOD OF PRODUCING REDUCED METAL

(75) Inventors: Takao Harada, Osaka (JP); Hidetoshi Tanaka, Osaka (JP)

(73) Assignee: Kabushiki Kaisha Kobe Seiko Sho (Kobe Steel, Ltd.), Kobe (JP)

( * ) Notice: Subject to any disclaimer, the term of this patent is extended or adjusted under 35 U.S.C. 154(b) by 0 days.

(21) Appl. No.: 09/988,521

(22) Filed: Nov. 20, 2001

(65) Prior Publication Data

US 2002/0123019 A1 Sep. 5, 2002

(30) Foreign Application Priority Data

Dec. 7, 2000 (JP) ........................ 2000-372876

(51) Int. Cl.$^7$ .............................. F27B 9/16; C21B 11/08
(52) U.S. Cl. ...................... 432/138; 266/173; 266/177
(58) Field of Search ................ 432/138, 139, 432/124, 195; 266/173, 177, 197

(56) References Cited

U.S. PATENT DOCUMENTS

| 4,227,875 | A | * | 10/1980 | Hall ........................ 432/124 |
| 4,578,031 | A | | 3/1986 | Johnson et al. |
| 4,597,564 | A | * | 7/1986 | Hanewald et al. .......... 432/138 |
| 5,186,741 | A | * | 2/1993 | Kotraba et al. ............. 75/484 |
| 5,885,521 | A | * | 3/1999 | Meissner et al. ........... 266/179 |
| 6,413,471 | B1 | * | 7/2002 | Kamikawa et al. ......... 432/138 |

FOREIGN PATENT DOCUMENTS

| CH | 649 096 A5 | 6/1985 |
| DE | 11 51 823 B | 7/1963 |
| FR | 803 478 A | 10/1936 |

OTHER PUBLICATIONS

U.S. patent application Ser. No. 09/988,521, Harada et al., filed Nov. 20, 2001.
U.S. patent application Ser. No. 10/395,340, Maki, et al., filed Mar. 25, 2003.
U.S. patent application Ser. No. 10/396,516, Harada et al., filed Mar 26, 2003.

* cited by examiner

Primary Examiner—Gregory Wilson
(74) Attorney, Agent, or Firm—Oblon, Spivak, McClelland, Maier & Neustadt, P.C.

(57) ABSTRACT

In a rotary hearth furnace for producing reduced metal through heating and reducing carbon containing materials composed of at least metal oxide-containing material and carbon-containing reduction material, a hearth structure is provided by which a refractory in a hearth lateral end is not damaged and carbon containing materials do not fall down to a water sealing section of the rotary hearth furnace.

The upper part of a hearth lateral end 1$a$ is covered with the lower end 2$a$ of a side wall 2 of a hood covering the whole hearth, and a cooling means 3 is installed in the side wall lower end 2$a$.

8 Claims, 6 Drawing Sheets

ROTARY HEARTH FURNACE FOR PRODUCING REDUCED METAL AND METHOD OF PRODUCING REDUCED METAL

BACKGROUND OF THE INVENTION

1. Field of the Invention

The present invention relates to a rotary hearth furnace for producing reduced metal through heating and reducing carbon containing materials composed of at least metal oxide-containing material and carbonaceous reduction material, and in particular, to a structure of a hearth.

2. Description of Related Art

Lately, as steel products are actively produced by using an electric arc furnace, demand for reduced iron is gradually increasing due to the problems for supply of scrap as the main raw material of the steel products or request for producing high quality steel in the electric arc furnace.

As one of the processes for producing reduced iron, a method is well known, by which fine ore and coal material such as powder coal or coke are mixed to form a agglomerative material such as pellet, which is charged into a rotary hearth furnace and heated up to a high temperature to reduce iron oxide in iron ore for obtaining solid metallic iron.

Further, such a reduction method can be used not only for production of metallic iron but also for reduction of non-ferrous metal such as Ni and Cr.

Reduced iron is produced by the rotary hearth furnace as an example as follows (refer to FIG. 5).

(1) Powdered iron oxide and powdered carbonaceous material are mixed and pelletized to form green pellets.

(2) The green pellets are heated up to such a temperature area that combustible volatile components generated from the pellets may not ignite to remove contained moisture to obtain dry pellets (hereinafter will be simply referred to as pellet).

(3) The pellets 7 are supplied into the rotary hearth furnace 17 by using a suitable charging unit 13 to form a pellet layer on the rotary hearth 1.

(4) The pellet formed a layer is radiant heated for reduction by combustion of a burner 17c installed in the upper part of the furnace inside to produce reduced iron through metalizing.

(5) Such reduced iron is cooled to a temperature allowing mechanical handling by direct gas spraying to reduced iron by a cooler 18 or indirect cooling by using cooling water jacket, and then discharged from the furnace by a discharging unit 12 to obtain reduced iron products.

FIG. 6 is a sectional view of the rotary hearth furnace for illustrating the said process (4). The rotary hearth 1 has a number of wheels 19 attached to the bottom thereof so as to be rotated at a constant speed on a circular track 20 by a driving unit (not shown). Meanwhile, a hood 21 for covering the upper part of the rotary hearth consists of a ceiling 22 and side wall 2 and fixed to the ground. Therefore, it is necessary to shield gas within the furnace and the atmospheric air while allowing the rotary hearth 1 to be rotated freely about the hood 21, and water-sealing means 4 is installed in general between the rotary hearth 1 and the side wall 2. The water sealing means 4, as shown in FIG. 6, comprises a metallic circular box called seal trough filled with water and integrally installed at the lower end of the both side walls 2, and a downward metallic circular skirt 4a integrally installed in the hearth 1 under the both lateral ends 1a of the rotary hearth 1, in which the leading ends of the skirt 4a are immersed into water 4b in the seal troughs 4 without contacting with the seal troughs 4.

Since the hearth 1 is radiant heated up to a high temperature from the upper part by the burner 17c installed in the hood 22 when the pellets 7 are loaded on the upper part thereof, a structure is adopted in which an insulating unshaped refractory 5 is layered at the lower surface side of the hearth and a heat-resisting unshaped refractory is layered at the upper surface side of the hearth.

Further, since heating and cooling are repeated in a short time period (for 10 to 20 minutes) near the upper surface of hearth 1 for loading the pellets 7, general grade of refractory may be damaged by spalling and the like. Also, due to the various factors such as rolling, abrasion or dropping impact in supplying the pellets 7 to the upper surface of the hearth 1, fine generated from the pellets 7 is mixed into the furnace 17 together with the pellets 7 and reduced into iron powder to form an accumulated material layer on the upper surface of the hearth 1. Therefore, near the upper surface of the hearth 1 is frequently formed by a hearth material having iron oxide as the main ingredient to be free from the problem of spalling and easily remove the accumulated material layer.

Further, as shown in FIG. 6, in order to prevent the pellets 7 from falling down to the seal trough 4, the pellets 7 are not loaded near the tips of the hearth lateral ends 1a. Therefore, while the refractory upper surface 1u of the hearth lateral ends 1a is directly exposed to radiant heat from the furnace inside such as the hot burner 17c, the inside of the ceiling 22 of the hood 21 and the inside of the side wall 2 and raised in temperature to expand in a large margin, the refractory side walls 1s of the hearth lateral ends 1a are not directly exposed to radiant heat and thus do not expand. Therefore, a large amount of stress caused by heat distortion takes place in the edge 1e (hereinafter will be referred to as refractory hearth edge of the hearth lateral ends 1a, which tends to have spalling together with low strength due to insufficient burning. When the hearth edge 1e has spalling, broken pieces fall down to the seal trough 4 and the pellets 7 loaded near the hearth edge 1e tend to fall down to the seal trough 4 as well. This not only decrease the yield of the reduced iron products but also may stop the rotation of the hearth 1 since a sludge-form deposit occurs at the bottom of the seal trough 4 and the leading end of the skirt 4a is buried in the deposit.

SUMMARY OF THE INVENTION

Accordingly, it is an object of the present invention to provide a hearth structure, by which a refractory at hearth lateral ends is not damaged and carbon containing materials (such as carbon containing pellet) do not fall down to water sealing means (seal trough). Further, it is another object of the invention to provide a method for improving the yield of reduced metal.

As means for solving the said problems, the invention according to claim 1 relates to a rotary hearth furnace for producing reduced metal through heating and reducing carbon containing materials composed of metal oxide-containing material and carbonaceous reduction material, comprising: a hearth for loading said carbon containing materials thereon; and a hood for covering the whole hearth form upside, wherein the upper parts of both lateral ends of said hearth are covered with side wall lower end of the hood; and cooling means is provided at the lower end of the side wall. In this case, while being covered with the side wall lower end of said hood, the upper sides of the both lateral ends of said hearth upper surface may be covered with a portion of the side wall lower end.

The side wall lower end of the hood covers over the lateral ends of the hearth upper surface so that the refractory of the lateral ends is not directly exposed to radiant heat from the furnace inside. Then, the hearth edge is not heat distorted and spalling thereof may not take place. Also, the cooling means is installed in the side wall lower end to moderate heat distortion in furnace inside edges of the side wall lower end and to avoid spalling in these portion.

The invention according to claim 2 relates to the rotary hearth furnace for producing reduced metal according to claim 1, a vertical section including a rotary axis of said rotary hearth furnace has a combination of θ and L satisfying both of the following equations 1 and 2:

$$L \cdot \tan\theta \geq 30 \qquad \text{Equation 1}$$

$$L \geq 0.16\theta^2 - 2.44\theta + 92 \qquad \text{Equation 2}$$

wherein θ(°) is the minimum depression angle for exposing at least a portion of the hearth lateral end when said hearth lateral end is looked downward from the leading end at said hearth center side in the side wall lower end, and L (mm) is the horizontal length from said leading end to a position on said lateral end to be the minimum depression angle.

According to this invention, since the temperature of the edge can be reduced to such a degree that spalling may not take place in the hearth edge when the atmospheric temperature in the furnace is at or under 1200° C., the effect of the invention according to claim 1 can be ensured.

The invention according to claim 3 relates to the rotary hearth furnace for producing reduced metal according to claim 2, wherein said equation 2 is replaced from $L \geq 0.16\theta^2 - 2.44\theta + 92$ to $L \geq 0.19\theta^2 - 2.44\theta + 100$.

According to this invention, even if the atmospheric temperature in the furnace is higher than 1200° C., the temperature of the hearth edge can be reduced to such a degree that spalling may not take place in the hearth edge when the atmospheric temperature is at or under 1400° C., and thus the effect of the invention according to claim 1 can be ensured.

The invention according to claim 4 relates to the rotary hearth furnace for producing reduced metal according to any one of claims 1 to 3, wherein said lateral end has an inclined surface with upward gradient toward a lateral leading end opposed to the hearth central side.

According to this invention, carbon containing materials do not fall down to the water sealing means (seal trough) without interfering rotation of the hearth.

The invention according to claim 5 relates to the rotary hearth furnace for producing reduced metal according to any one of claims 1 to 4, wherein said lateral end is formed of a burned precast refractory or a shaped refractory.

According to this invention, the refractory of the lateral end can be burned outside the furnace to have a sufficient degree of strength, by which the problem of low strength of the lateral end due to the insufficient burning described in the above can be prevented so that spalling of the hearth edge can be prevented more effectively.

The invention according to claim 6 relates to a method of producing reduced metal through heating and reducing carbon containing materials composed of metal oxide-containing material and carbonaceous reduction material, comprising the steps of: charging said carbon containing materials on said hearth of rotary hearth furnace for producing reduced metal according to any one of claims 1 to 5; and hot reducing the carbonaceous heat-treated products.

According to this invention, spalling does not take place in the hearth edge and thus the pellet may not fall down to the seal trough so that the yield of reduced metal can be improved.

DESCRIPTION OF THE PREFERRED EMBODIMENTS

Figure 1:
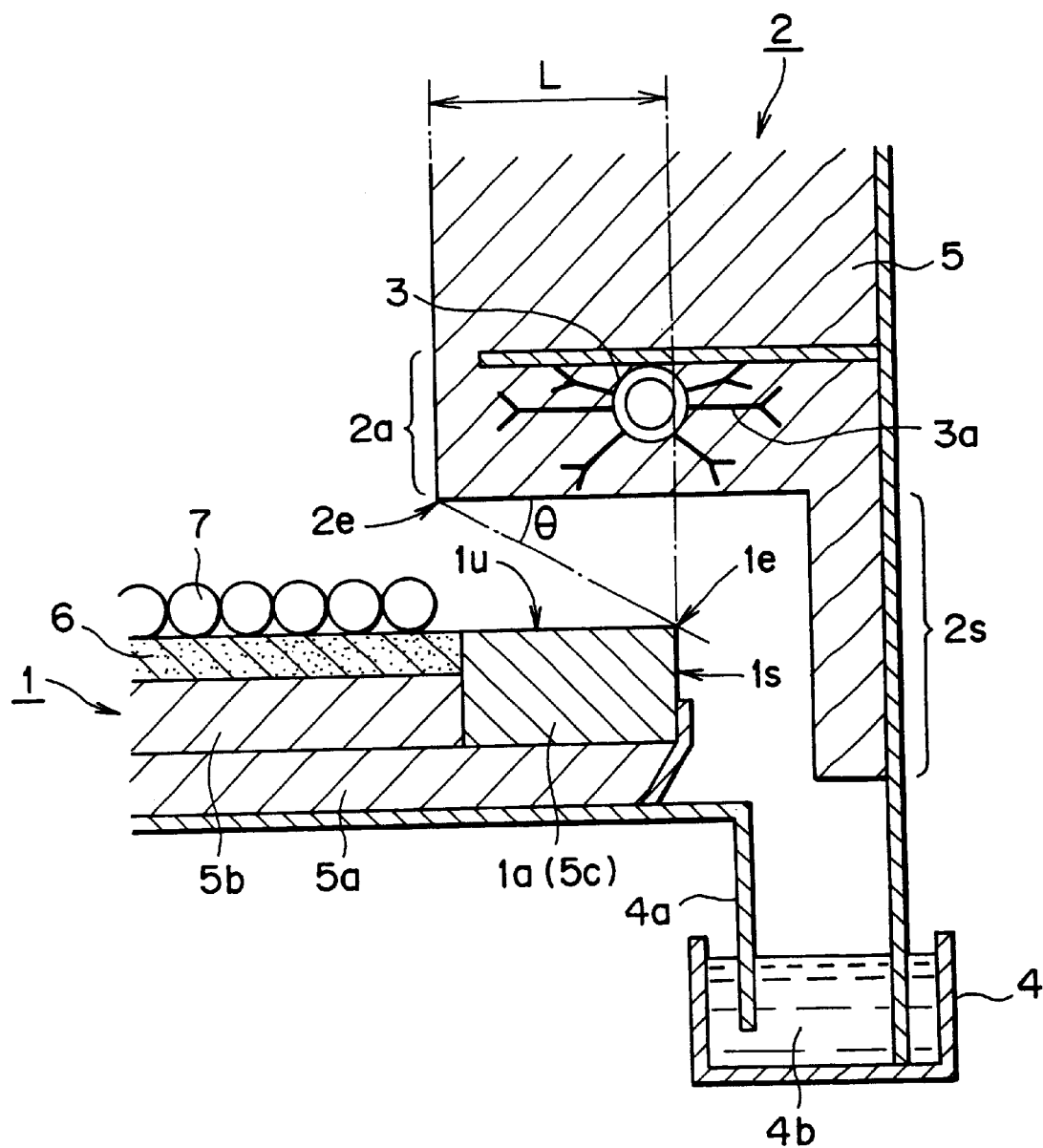
FIG. 1 is a sectional view for illustrating a hearth structure of a rotary hearth furnace for producing reduced metal of the present invention.
Figure 5:
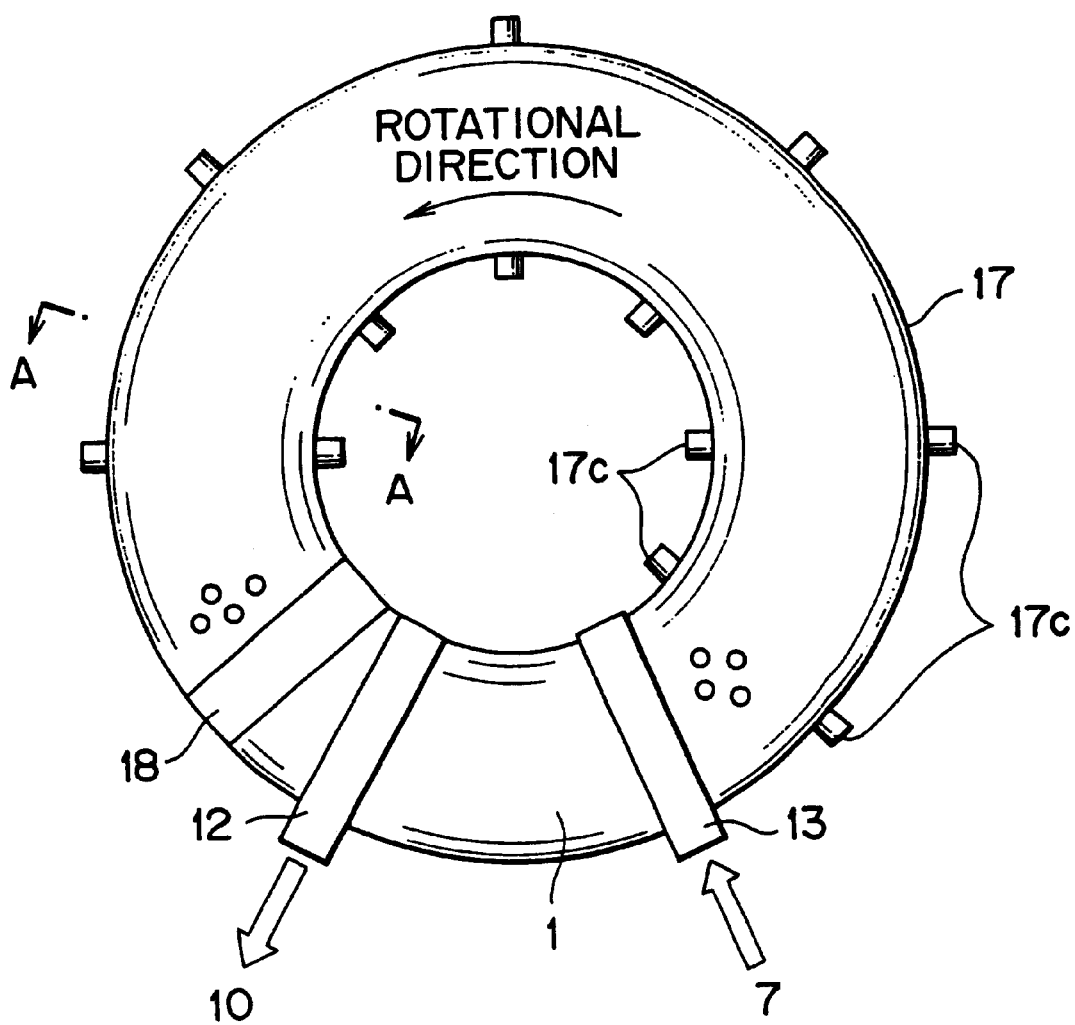
FIG. 5 is a plan view for schematically illustrating a rotary hearth furnace for producing reduced iron.
Figure 6:
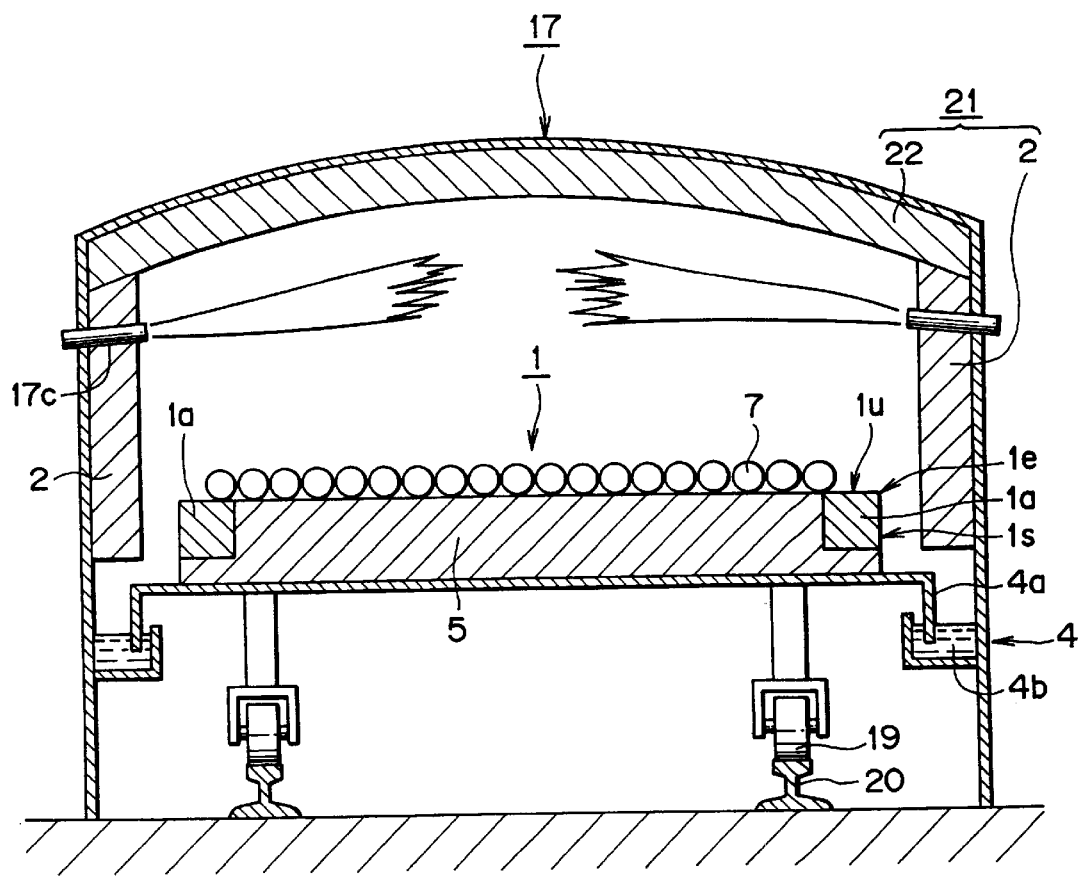
FIG. 6 is a sectional view for illustrating an original hearth structure of a rotary hearth furnace for producing reduced iron.

FIG. 1 shows an embodiment of the invention. Referring to FIG. 1, a structure near a side wall of a vertical section in a radial direction of a rotary hearth (for example, a section along A—A line shown in FIG. 5) in a combustion unit shown in FIG. 5 (an area from a charging unit 13 to a cooling unit 12 in a rotational direction. Also, since both of the outer periphery side and the inner periphery side have the same structure near the side wall, only one of them is shown. The hearth 1 consists of a layered-configuration from the bottom to the top, for example, in the order of an insulating refractory layer 5a, a heat-resisting refractory layer 5b and a hearth material layer 6, except for a lateral end 1a, which is constituted by providing a layer of a precast refractory which is burned 5c hereinafter will be referred to as burned precast refractory on the insulating refractory layer 5a. Further, the lateral end 1a is adjacent the lower end 2a of a side wall 2 of a hood and covered thereby to be overlapped at a certain portion. This prevents the upper surface 1u of the lateral end 1a from being directly exposed to radiant heat from a furnace inside, and in particular, the upper side of the furnace so that heat distortion of a hearth edge 1e is moderated thereby decreasing probability of damage such as spalling, errosion by discgarging hot DRI, corrosion, etc. due to very high temperature condition at the hearth edge 1e. Even if it is unnecessary to restrict the lateral end 1a to the burned precast refractory 5c, since the lateral end 1a is previously burned to show a sufficient amount of strength when the burned precast refractory 5c is used, probability of damage in the hearth edge 1e can be reduced further. Also, when a frame is prepared, as the burned precast refractory 5c, with a shape for dividing the outer periphery side and the inner periphery side of the hearth 1 into a suitable number in the circumferential direction and a burned material (curb brick) is prepared by casting an unshaped refractory into the frame followed by forming outside the furnace and burning to be installed in the furnace, even if any one of curb bricks 5c is, spalled the prearranged curb brick 5c replaces the spalled one after the furnace is cooled so that the operation can be reopened without delay. Even if a shaped refractory can replace the burned precast refractory to obtain the same effect, since the shaped refractory requires operations such as cutting the refractory to match the shape of the hearth thereby frequently raising working cost, the burned precast refractory is desired in general. On the contrary, when the refractory of the lateral end 1a is installed with the unshaped refractory in the furnace, a time is additionally required, after cooling the furnace, for repairing the spalled portion with the unshaped refractory and burning this repaired portion by the burner 17c of the furnace. So, in addition that the operating rate of the rotary hearth furnace 17 is lowered, there is a problem that some portions such as the sides is of the hearth have low strength since the whole refractory of the lateral end 1a cannot be hot burned.

The lower end 2a of the side wall is provided for example as an unshaped refractory, in which cooling means 3 is buried for example as a metallic cooling water pipe. Preferably, the cooling water pipe 3 is welded with an anchor plate 3a so that a cooling effect can reach up to the refractory surface. Alternatively, a box-shaped cooling water channel, for example, may be used instead of the cooling water pipe 3, and cooling may be carried out using gas instead of water. Since cooling is carried out up to the refractory surface, the strength of the refractory itself can be raised thereby preventing wear of the refractory surface due to the welding and the like. Further, the temperature difference is reduced between the furnace inner surface in the side wall lower end and the lower surface so that heat distortion of the side wall edge 2e can be moderated to prevent damage of the side wall edge 2e. If the cooling means 3 is not installed in the side wall lower end 2a, the side wall edge 2e is damaged due to the heat distortion by the temperature difference between the furnace inner surface and the lower surface, and an effect covering (A) the hearth lateral end 1a is restrained so that the hearth edge 1e may be damaged. Further, it is preferable to bury the cooling means 3 such as cooling water pipe or box-shaped cooling water channel in the side wall lower end 2a since the buried cooling means 3 can be adapted to serve to support the weight of the side wall refractory 5 in addition to the said effect.

Installation of the hearth refractory is preferably performed, for example, according to the following order: first, the insulating shaped or unshaped refractory layer 5a is installed across the whole hearth width followed by aging and solidification. Over the refractory layer 5a, are arranged the curb bricks 5c of the burned precast refractory across the whole inner and outer peripheries of the hearth lateral end to form a bank 1a (which indicates A, however description of A will be omitted hereinafter). The heat-resisting unshaped refractory 5b is installed between the bank 1a of the inner and outer peripheries as depressed slightly more than the bank 1a. Then, the furnace is heated by the burner 17c to dry and burn the unshaped refractory 5b. In a depression made of the bank 1a and the unshaped refractory 5b after burning is filled a hearth material 6 having iron oxide as the main ingredient as the shape of lump or powder, which is heated by using a burner 17c to form the hearth surface for loading pellets 7. This provides the hearth free from damage due to the spalling and capable of maintaining flatness since an accumulated material layer formed on the hearth upper surface may be easily removed. Alternatively, the curb brick 5c may be installed after the unshaped refractory 5b is applied, dried and solidified.

Then, the inventors found that spalling of the hearth edge 1e takes place due to the heat distortion of the hearth edge 1e, which is closely related to the temperature of the hearth edge 1e, and studied as follows.

Referring to FIG. 1, the temperature near the hearth edge 1e is changed due to the geometric configuration near the hearth lateral end 1a, whereas direct measurement thereof is difficult. Therefore, considering radiation heat-transfer via a gap between the hearth 1 and the side wall 2 from the furnace inside and conduction heat-transfer transferred from the upper surface of the hearth 1, the temperature of the hearth edge and the like are estimated by means of heat-transfer calculation.

Figure 2:
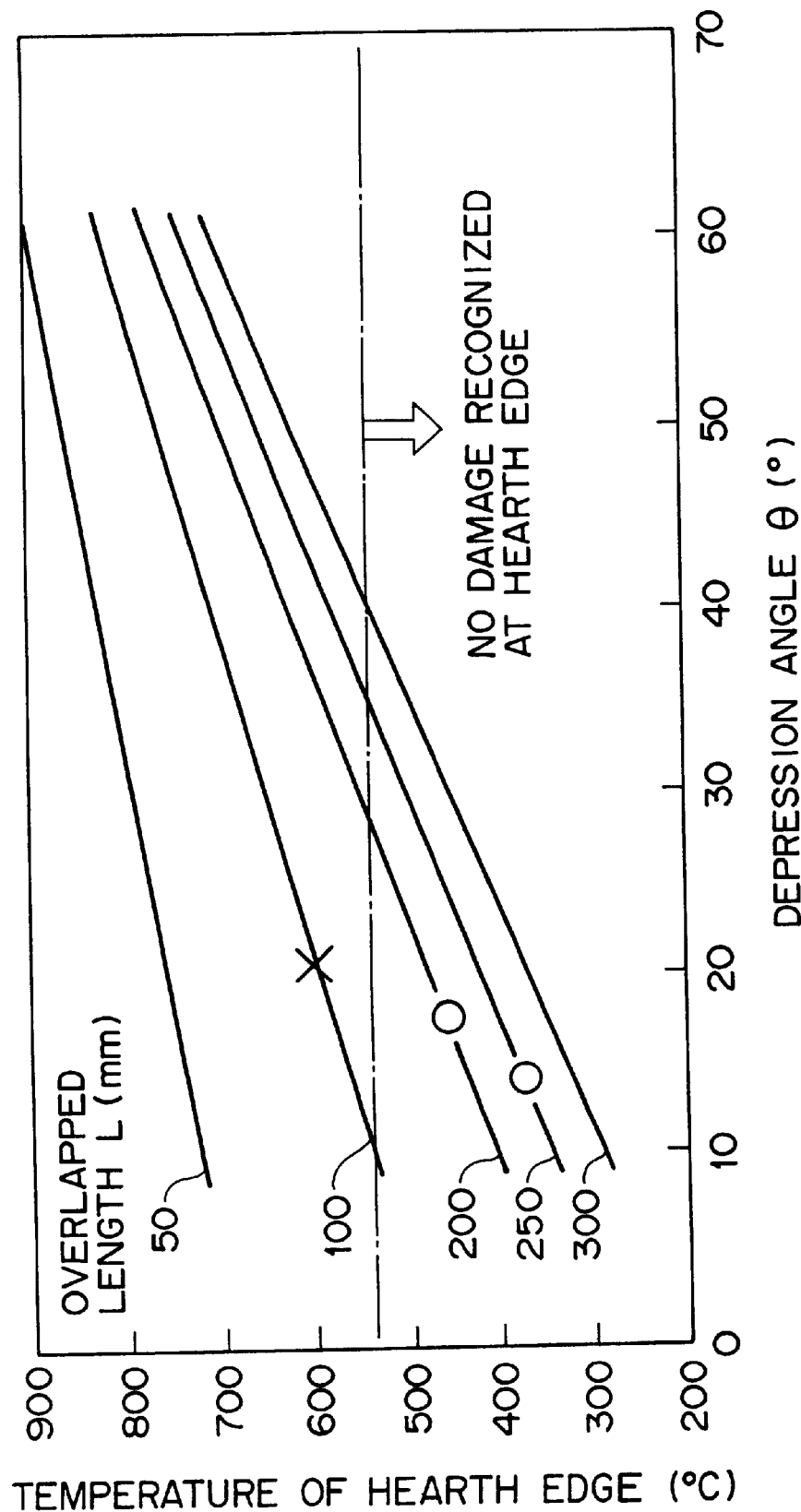
FIG. 2 illustrates the relation among an overlapped length L, a depression angle θ and the temperature of a hearth edge.

Referring to FIG. 2, when the atmospheric temperature in the furnace is set 1400° C. near to the upper limit temperature in production of reduced iron by using the rotary hearth furnace 17, plotting is made about the temperature of the hearth edge obtained through heat-transfer calculation using parameters such as a depression angle θ for looking down the hearth edge 1e from the side wall edge 2e shown in FIG. 1 and a horizontal length L from the side wall edge 2e to the hearth edge 1e (length where the side wall lower end and the hearth upper surface are overlapped, hereinafter will be simply referred to as overlapped length). Further, hearth structures (corresponding to experiment Nos. 2, 4 and 5 which will be described hereinafter) are provided, in which the depression angle θ and the overlapped length L are varied into three kinds by using the burned precast refractory of alumina-based castable refractories to the hearth lateral end in a existing rotary hearth furnace (hearth diameter 8.5 m and hearth width 1.25 m). The atmospheric temperature is set about 1400° C. in the said furnace to carry out experiments of producing reduced iron for a certain time period (22 to 30 days), spalling of the hearth edge 1e is observed and results thereof are shown in FIG. 2. In FIG. 2, o marks mean that the hearth edge 1e has no spalling, and x marks mean that the hearth edge 1e has spalling. From these results, it is known that the hearth edge 1e has very low probability of spalling when the temperature of the hearth edge is kept at or under 550° C. Preferably, a overlapped length L is set as large as possible and depression angle θ is set as small as possible in order to keep the temperature of the hearth edge at or under 550° C., however, it is necessary to consider the following conditions.

Further, if the gap between the hearth lateral end 1a and the side wall lower end 2a is set too small, the pellet 7 may be choked in the gap to interrupt rotation of the hearth 1. Therefore, the gap is preferably at least 30 mm considering that the diameter of the pellet in use is 5 to 20 mm in general.

As above, in order to prevent spalling of the hearth edge 1e, it is desired to satisfy the following equations 1 and 2:

$$L \cdot \tan\theta \geq 30 \qquad \text{Equation 1}$$

$$L \geq 0.16\theta^2 - 2.44\theta + 92 \qquad \text{Equation 2}$$

wherein, L has the unit of mm, and θ has the unit of degree (°) Further, Equation 2 is obtained by reading combinations of the overlapped length L and dip θ when the temperature of the hearth edge is 550° C. from FIG. 2 approximating in curve.

Figure 3:
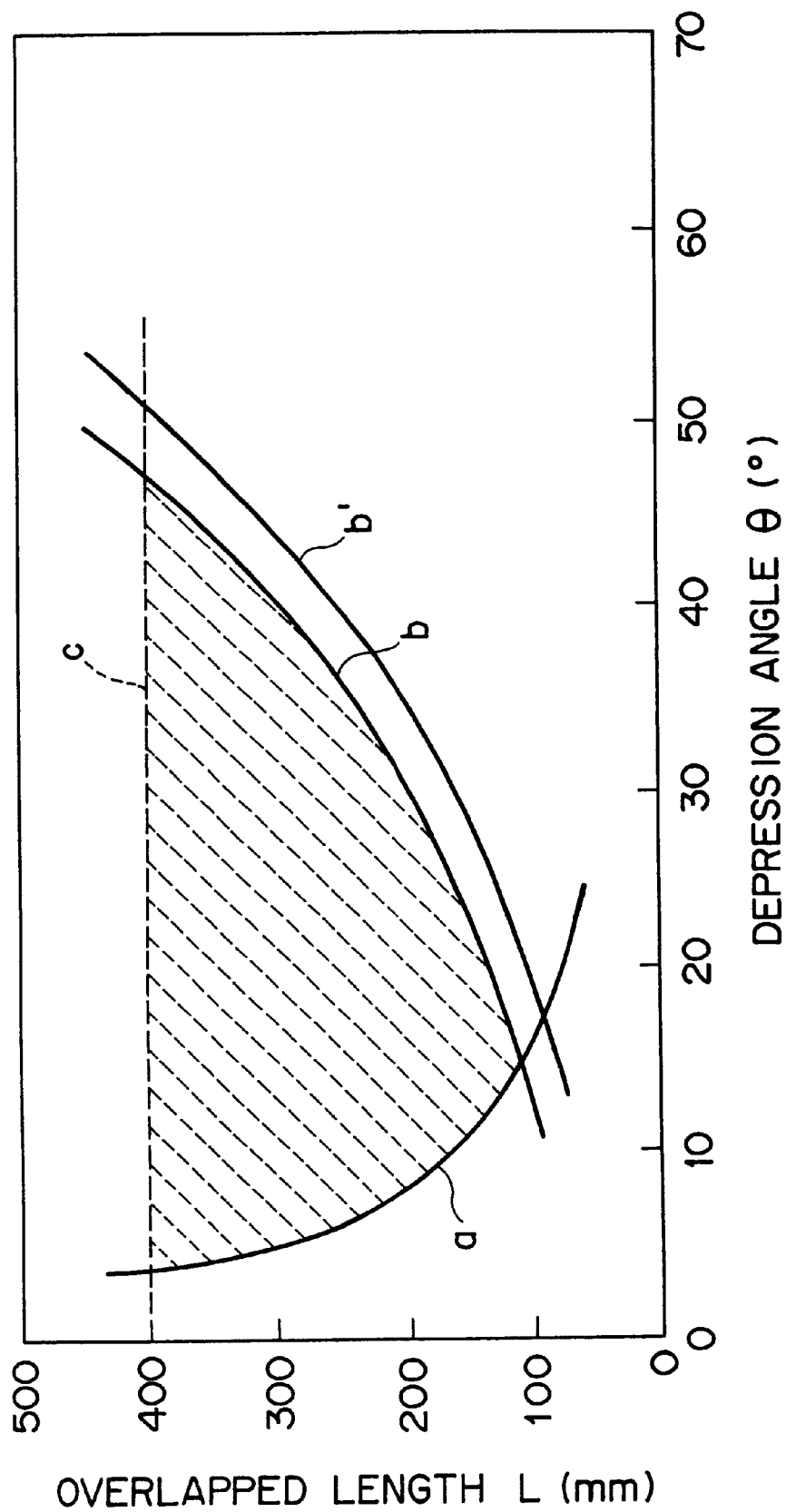
FIG. 3 shows the combination area of the overlapped length L and the depression angle θ of the invention according to claims 2 and 3.

FIG. 3 shows the said Equations 1 and 2. In other words, an area over a curve corresponds to Equation 1, and another area over a curve b corresponds to Equation 2. Therefore, combinations of L which is arbitrary points in the area over both of the curve a and the curve b (including those points on the curves) and θ so that spalling of the hearth edge 1e can be prevented.

Moreover, if the overlapped length L is set at or under 400 mm, the open area of furnace hearth can be minimized which is not used for production of reduced iron while it is ensured a thickness necessary for heat insulation of the furnace which is the original purpose of the side wall 2, which is preferable in economical basis such as reduction of furnace manufacturing cost. Therefore, the combinations of L and θ are selected in the range of an inclined region of FIG. 3 defined by the straight line c and the curves a and b, in which a region marked with dotted lines under the straight line c corresponds to a condition of L≦400 mm. Then, preferably, spalling of the hearth edge 1e can be prevented and manufacturing cost of the furnace can be reduced.

Further, the said description shows a preferred condition that the atmospheric temperature is 1400° C., which is near the upper limit, in the furnace in production of reduced iron by the rotary hearth 17, whereas the atmospheric temperature in the furnace is sometimes set 1200° C. caused by several limitations such as raw material features in use. In this case, the conditions of Equation 2 are moderated since the temperature of hearth edge is lowered compared with the atmospheric temperature in the furnace of 1400° C. The atmospheric temperature is set 1200° C. and heat-transfer is calculated as the same as above to obtain a drawing (not shown) as in FIG. 2, by which the hearth edge 1e has low probability of spalling. Under the condition that the leading end of the edge has a temperature at or under 550° C., Equation 2' is obtained as follows:

$$L \leq 0.16\theta^2 - 2.44\theta + 92 \qquad \text{Equation 2'.}$$

Equation 1 is a restricting condition that is simply geometrically determined regardless of the atmospheric temperature in the furnace with no change, in which a preferred combination area of the overlapped length L and the depression angle θ in the atmospheric temperature in the furnace at 1200° C. satisfies both of Equation 1 and Equation 2'. When, Equation 2' is drawn together in FIG. 3, an area over the curve b' corresponds to Equation 2' and the area over the curve a and the area over the curve b' (including the area on the curve b'), correspond to the range of selecting L and θ, which is wider than when the atmospheric temperature in the furnace is 1400° C.

Since the atmospheric temperature in the furnace differs to the qualities of raw material in use, a suitable furnace structure may be used based upon the technical principle of the invention in this case.

Further, while the temperature at the hearth edge is varied more or less according to thermal conductivity of the burned precast refractory 5c and also material of the refractory causes difference more or less to the temperature of the hearth edge where the hearth edge 1e has no spalling, in the case of the burned precast refractory in the range of thermal conductivity and material used in general, the range for preventing spalling of the hearth edge 1e can be expressed as in FIG. 3.

Figure 4A:
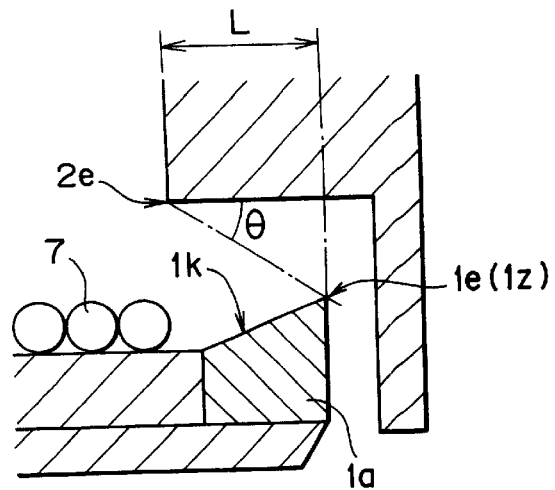
FIG. 4 is a sectional view for illustrating a hearth structure having an inclined surface with upward gradient toward the hearth edge of the invention according to claim 4.
Figure 4B:
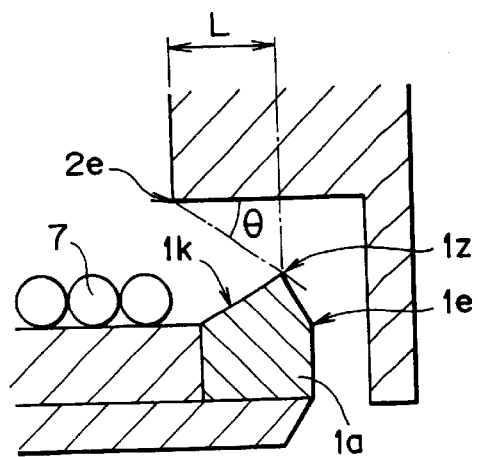
Figure 4C:
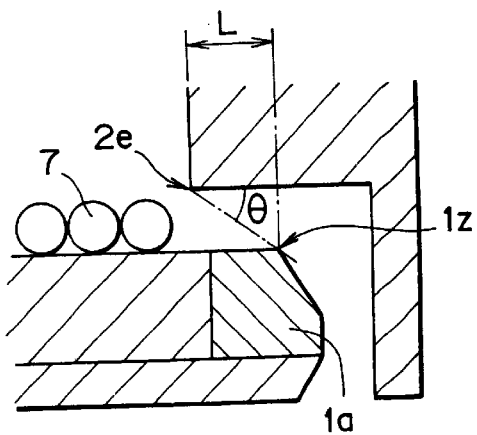

While the upper surface of the hearth lateral edge 1a is formed flatness in general so that reduced metal can be easily discharged by a screw or a scraper, in order to prevent the pellets from falling down to the seal trough, an inclined surface 1k may be formed having upward gradient toward the hearth edge (lateral leading end) 1e on the furnace lateral end 1a as shown in FIGS. 4A and 4B. While the angle of the inclined surface 1k is not specifically restricted, in the hearth lateral end in a region (inner periphery side in general) different from the region (outer periphery side in general) where the pellets of reduced iron are discharged from the furnace by a discharging unit, the angle is preferably set at least angle of repose of the pellets 7 for example at least 25° so that the pellets 7 reaching the inclined surface may easily return into the original furnace. Moreover, it is preferable that near the hearth edge 1e is previously cut obliquely (FIG. 4C) or given with radius R (not shown) to have a configuration for dispersing stress so that the hearth edge 1e may hardly have spalling. Further, definition of the overlapped length L and depression angle θ is shown together in FIGS. 4A to 4C, in which such a configuration of the hearth lateral end 1a is adopted. In other words, depression angle θ is the minimum depression angle for exposing at least a portion of the hearth lateral end 1a when the hearth lateral end 1a is looked downward from the side wall edge 2e. Further, the overlapped length L is a horizontal distance up to a position 1z on the hearth lateral end 1a having the minimum depression angle θ. The position 1z is based upon definition of the overlapped length L and the depression angle θ, since radiant heat does not directly reach an area of the furnace beyond the position 1z while radiant heat directly reach the other area of the furnace inward from the position 1z, the position 1z becomes a site for generating heat distortion in the maximum amount.

Further, while the pellets are described as an example of the carbon containing materials in the said embodiment, the carbon containing materials are not limited thereto but may include briquette shape, plate shape, nugget shape, powder mixture and the like.

EXAMPLES

In a furnace structure, in which a rotary hearth furnace has hearth diameter 8.5 m and hearth width 1.25 m, and modification is variously made about overlapped length L, depression angle θ, existence of inclined surface with upward gradient toward the hearth edge (lateral leading end), burying of the cooling water pipe in the side wall lower end, type of the lateral end refractory and installing method, after the atmospheric temperature in the furnace is set 1400 or 1200° C. and reduced iron is produced for a predetermined time period (about 30 days) under each condition, the degree of damage of the hearth edge and the increase of sludge in the seal trough are investigated. Results thereof are shown in Table 1 as follows.

TABLE 1

| No. | | Hearth structure | | | | Operation | Operation result | | |
|---|---|---|---|---|---|---|---|---|---|
| | | Overlapped length L (mm) | Dip θ (°) | Upward inclined surface toward hearth edge | Kind of refractory of lateral end | Cooling means about side wall lower end | conditions Atmospheric temperature in furnace (° C.) | | |
| | | | | | | | | Spalling at hearth edge | Increase of sludge in seal trough | Spalling at side wall edge |
| 1 | Comparative examples | 0 | — | — | Casting of alumina-based castable | — | 1400 | Large along circumference | Very large | — |
| 2 | | 100 | 21 | No | | No | | Large along circumference | Very large | Large along circumference |
| 3 | Embodiments | 200 | 17 | | refractories in furnace | Burying cooling water pipe | | Crack only | Drastic decrease | No |
| 4 | | 200 | 17 | | alumina-based | | | No | Drastic decrease | No |
| 5 | | 250 | 14 | | burned precast refractory | | | No | Drastic decrease | No |
| 6 | | 150 | 25 | | | | 1200 | No | Drastic decrease | No |
| 7 | | 250 | 14 | Yes | | | 1400 | No | Almost no | No |

Referring to experiment No. 1 in Table 1, a hearth structure is selected in which the upper part of the conventional hearth lateral end is not covered with side wall lower end, and the hearth lateral end is formed by casting alumina-based castable refractories(containing $Al_2O_3$ 50 mass% and $SiO_2$ 45 mass%) in the furnace. In this case, after operation for 22 days at the atmospheric temperature in the furnace of 1400° C., it is observed that the hearth edge has spalling in a great amount along the circumference and the amount of sludge in the seal trough is also increased in a great amount.

Referring to experiment No. 2, while a structure (L is 100 mm and θ is 21°) is selected in which the hearth lateral end is formed by casting the alumina-based castable refractories in the furnace and the side wall lower end covers directly over the lateral end as in experiment No. 1, the cooling means is not installed in the side wall lower end. Even in this case, after operation for 22 days at the atmospheric temperature in the furnace of 1400° C., it is found that the hearth edge has spalling in a great amount along the circumference, the amount of sludge in the seal trough is increased in a great amount, and the side wall edge has spalling also in a great amount along the circumference. It is considered that the cooling means is not installed to damage the side wall edge so that the effect of shielding radiant heat from the furnace inside is taken away to damage the hearth edge.

Referring to experiment No. 3, the hearth lateral end is formed by casting the alumina-based castable refarctories in the furnace as in experiments Nos. 1 and 2, in which the length of covering directly over the lateral end with the side wall lower end (overlapped length) is slightly longer than in experiment No. 2 and the depression angle is also slightly smaller than in experiment No. 2 (L is 200 mm and θ is 17°), and further, in the side wall lower end is buried the cooling water pipe welded with the anchor plate. In this case, even after the operation for 30 days at the atmospheric temperature in the furnace of 1400° C., the hearth edge has only slight cracks which does not reach spalling and no damage is found in the side wall edge. Moreover, the increase of sludge in the seal trough is reduced in a great amount. As the cooling means is installed, spalling of the side wall edge is prevented and the effect of shielding radiant heat from the furnace inside is enabled to prevent spalling of the hearth edge, and as a result, the pellets and the like can be prevented from falling down to the seal trough.

In experiment No. 4, only the casting method of the refractory of the hearth lateral end is changed to the method for casting the curb brick (containing $Al_2O_3$ 50 mass% and $SiO_2$ 45 mass%) of the burned precast refractory, in which other conditions are the same as those in experiment No. 3. As a result, damage such as cracks is not found in the hearth edge at all. This is considered as an effect adopting the curb brick, which is previously burned in a sufficient amount outside the furnace and strength is sufficiently obtained up to the edge compared to the method of casting the unshaped refractory in the furnace.

In experiment No. 5, the overlapped length is longer and the depression angle is smaller (L is 250 mm and θ is 14°) than in the hearth structure in No. 4, in which other conditions are the same as in experiment No. 4. This also obtains the substantially same effect as experiment No. 4. From results of experiment Nos. 3 to 5, at the atmospheric temperature in the furnace of 1400° C., when the combination of the overlapped length 1 and the depression angle θ satisfies the said Equations 1 and 2 at the same time (in the area over both of the curve a and the curve b in FIG. 3), it can be confirmed that the effects are obtained reliably according to the invention.

In experiment No. 6, the overlapped length L and the depression angle θ are varied to exist in the range (L is 150 mm and θ is 25°) over both of the curve a and the curve b' even though not over both of the curve a and the curve b in FIG. 3, and the atmospheric temperature in the furnace is lowered to 1200° C., in which other conditions are the same as in experiment Nos. 4 and 5. This also obtains the substantially same effect as experiment Nos. 4 and 5. When the atmospheric temperature in the furnace is lowered to 1200° C., it is confirmed that the combination range of L and θ is widened compared to the atmospheric temperature of 1400° C.

In experiment No. 7, the overlapped length L and depression angle θ have the same value as experiment No. 5 and an inclined surface with upward gradient toward the edge is formed at the most edge side of the hearth lateral end (horizontal length is 100 mm and gradient is 30°), in which other conditions are the same as in experiment Nos. 4 and 5. In this case, any of the hearth edge and the side wall edge is not damaged at all and the increase of sludge in the seal trough is not found almost at all. It is considered that in the hearth lateral end is formed the inclined surface with upward gradient (20 to 25°) slightly larger than angle of repose of the pellets so that the pellets are almost prevented from falling down to the seal trough.

According to the invention described in claim 1, the side wall lower end of the hood covers over the lateral ends of the hearth upper surface so that the refractory of the lateral ends is not directly exposed to radiant heat from the furnace inside. Then, the hearth edge is not heat distorted and spalling thereof can be prevented. Also, since the cooling means is installed in the side lower end, heat distortion of the side wall edge can be moderated thereby preventing spalling in these portions.

According to the invention described in claims 2 and 3, since the temperature of the hearth edge can be reduced to such a degree that spalling may not take place in the hearth, the effect of the invention according to claim 1 can be ensured.

According to the invention described in claim 4, the lateral end has an inclined surface with upward gradient toward a lateral leading end, carbon containing materials do not fall down to the seal trough so that the effect of the invention according to claims 1 to 3 can be obtained without interfering rotation of the hearth.

According to the invention described in claim 5, the refractory of the lateral end can be burned outside the furnace to have a sufficient degree of strength, by which the problem of low strength of the lateral end due to the insufficient burnig can be prevented so that spalling of the hearth edge can be prevented in a more effective manner.

What is claimed is:

1. A rotary hearth furnace for producing reduced metal through heating and reducing carbonaceous heat-treated materials including metal oxide-containing material and carbonaceous reduction material, comprising:

a hearth for loading said carbonaceous heat-treated materials thereon; and a hood for covering the whole hearth from above, wherein upper parts of both lateral ends of said hearth are covered with a side wall lower end of said hood, cooling means is provided at the lower end of the side wall, and at least one of said lateral ends has an inclined surface with upward gradient toward a lateral leading end opposed to the hearth central side.

2. The rotary hearth furnace for producing reduced metal according to claim 1, wherein at least one of said lateral ends is formed of a burned precast refractory or a shaped refractory.

3. A method of producing reduced metal, comprising the steps of:

heating metal oxide-containing material and carbonaceous reduction material to form carbonaceous heat-treated materials;

charging said carbonaceous heat-treated materials on said hearth of the rotary furnace for producing reduced metal according to claim 1; and heating and reducing the carbonaceous heat-treated materials.

4. A rotary hearth furnace for producing reduced metal through heating and reducing carbonaceous heat-treated materials including metal oxide-containing material and carbonaceous reduction material, comprisng:

a hearth for loading said carbonaceous heat-treated materials thereon; and a hood for covering the whole hearth from above, wherein upper parts of both lateral ends of said hearth are covered with a side wall lower end of said hood, cooling means is provided at the lower end of the side wall, and a vertical section including a rotary axis of said rotary hearth furnace has a combination of $\theta$ and $L$ satisfying both of the following equations 1 and 2:

$$L \cdot \tan\theta \geq 30 \quad \text{Equation 1}$$

$$L \geq 0.16\theta^2 - 2.44\theta + 92 \quad \text{Equation 2}$$

wherein $\theta$ (°) is a minimum depression angle for exposing at least a portion of one hearth lateral end when said one hearth lateral end is looked downward from a leading end at said hearth center side in the side wall lower end, and $L$(mm) is the horizontal length from said leading end to a position on said one lateral end to be the minimum depression angle.

5. The rotary hearth furnace for producing reduced metal according to claim 4, wherein said one lateral end has an inclined surface with upward gradient toward a lateral leading end opposed to the hearth central side.

6. The rotary hearth furnace for producing reduced metal according to claim 4, wherein said one lateral end is formed of a burned precast refractory or a shaped refractory.

7. A method of producing reduced metal, comprising the steps of:

heating metal oxide-containing material and carbonaceous reduction material to form carbonaceous heat-treated materials;

charging said carbonaceous heat-treated materials on said hearth of the rotary furnace for producing reduced metal according to claim 4; and heating and reducing the carbonaceous heat-treated materials.

8. A rotary hearth furnace for producing reduced metal through heating and reducing carbonaceous heat-treated materials including metal oxide-containing material and carbonaceous reduction material, comprising:

a hearth for loading said carbonaceous heat-treated materials thereon; and a hood for covering the whole hearth from above, wherein upper parts of both lateral ends of said hearth are covered with a side wall lower end of said hood, cooling means is provided at the lower end of the side wall, and a vertical section including a rotary axis of said rotary hearth furnace has a combination of $\theta$ and $L$ satisfying both of the following equations 1 and 2:

$$L \cdot \tan\theta \geq 30 \quad \text{Equation 1}$$

$$L \geq 0.16\theta^2 - 2.44\theta + 92 \quad \text{Equation 2}$$

and wherein $\theta$ (°) is a minimum depression angle for exposing at least a portion of one hearth lateral end when said one hearth lateral end is looked downward from a leading end at said heart center side in the side wall lower end, and $L$(mm) is the horizontal length from said leading end to a position on said one lateral end to be the minimum depression angle.

* * * * *